United States Patent
Paul (10) Patent No.: US 11,946,694 B2
(45) Date of Patent: Apr. 2, 2024

(54) STABILIZER REBOILER SALT FOULING ONLINE CLEANING

(71) Applicant: SAUDI ARABIAN OIL COMPANY, Dhahran (SA)

(72) Inventor: Mishar K. Paul, Udhailiyah (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 428 days.

(21) Appl. No.: 17/397,473

(22) Filed: Aug. 9, 2021

(65) Prior Publication Data

US 2023/0038451 A1 Feb. 9, 2023

(51) Int. Cl.
| | |
|---|---|
| *B08B 3/04* | (2006.01) |
| *B01D 3/14* | (2006.01) |
| *B08B 3/08* | (2006.01) |
| *B08B 3/10* | (2006.01) |
| *F25J 3/04* | (2006.01) |

(52) U.S. Cl.
CPC ............ *F25J 3/04884* (2013.01); *B01D 3/14* (2013.01); *F25J 2250/00* (2013.01)

(58) Field of Classification Search
CPC .. B01D 3/322; B08B 3/04; B08B 3/08; B08B 3/10; B08B 7/0064; B08B 7/0071
See application file for complete search history.

(56) References Cited

FOREIGN PATENT DOCUMENTS

EP 2977430 A1 1/2016

OTHER PUBLICATIONS

B. Assis et al., Constrained Thermohydraulic Optimization of the Flow Rate Distribution in Crude Preheat Trains, 91 Chem. Eng. Res. Des. 1517-1526 (2013).*
International Search Report Issued in Corresponding Application No. PCT/US2022/039817, dated Nov. 16, 2022, 5 pages.
Written Opinion Issued in Corresponding Application No. PCT/US2022/039817, dated Nov. 16, 2022, 5 pages.
Ouni et al., "Troubleshooting a Thermosiphon Reboiler—Why New is Not Always Better than Old," Chemical Engineering Transactions, vol. 69, 2018, 6 pages.

* cited by examiner

*Primary Examiner* — Randy Boyer
(74) *Attorney, Agent, or Firm* — Osha Bergman Watanabe & Burton LLP (57) ABSTRACT

A method of cleaning a condensate thermosyphon reboiler including modifying a flow rate of a hot oil stream introduced into the tube-side of a first condensate thermosyphon reboiler, modifying a flow rate of a condensate hydrocarbon stream introduced into the shell-side of the first condensate thermosyphon reboiler, and maintaining an operation of the condensate stabilizer system until the value of an overhead temperature of the first condensate thermosyphon reboiler is detected to have been modified from the first overhead temperature to a second overhead temperature. The method further includes modifying the flow rate of the condensate hydrocarbon stream from the second condensate flow rate to the first condensate flow rate, and modifying the flow rate of the hot oil stream from the second hot oil flow rate to the first hot oil flow rate.

12 Claims, 6 Drawing Sheets

STABILIZER REBOILER SALT FOULING ONLINE CLEANING

BACKGROUND

Connate water is often found with hydrocarbon fluids, such as crude oil, natural gas, and liquid condensates. Such water is co-produced with hydrocarbon fluids in the form of produced fluids. More often than not, the water is in the form of a highly-saline brine, comprising several salt species that super-saturate the water.

The presence of salts in the aqueous phase of the produced fluid can cause immediate damage to production equipment downhole, piping at the wellhead, and downstream to gas-oil separation plants (GOSPs). Often, the aqueous phase (with the salts dissolved) is separated at the wellhead through oil/water/gas separations devices. As well, the hydrocarbon phase may further be "washed" downstream at facilities, like GOSPs, to eliminate residual salts from the hydrocarbon streams.

SUMMARY

This Summary is provided to introduce a selection of concepts that are further described in the Detailed Description. This Summary is not intended to identify key or essential features of the claimed subject matter, nor is it intended to be used as an aid in limiting the scope of the claimed subject matter.

In one aspect, embodiments disclosed relate to a method of cleaning a condensate thermosyphon reboiler of a condensate stabilizer system. The condensate stabilizer system includes a plurality of condensate thermosyphon reboilers and a condensate stabilizer column. The condensate stabilizer column produces a mixed hydrocarbon/water vapor and a stabilized condensate from an unstablized hydrocarbon condensate. The stabilizer column is fluidly coupled separately to the shell-side of each of the plurality of condensate thermosyphon reboilers. The tube-side of each of the plurality of condensate thermosyphon reboilers includes a hot oil stream inlet and a hot oil stream outlet with the hot oil stream being fluid coupled separately to the hot oil stream inlet on each of the plurality of condensate thermosyphon reboilers. The method includes modifying a flow rate of a hot oil stream introduced into the tube-side of a first condensate thermosyphon reboiler having a pre-cleaning overhead temperature from a first hot oil flow rate to a second hot oil flow rate such that the pre-cleaning overhead temperature is modified to a first overhead temperature, the first overhead temperature having a value in a range from a first temperature to a second temperature. The method further includes modifying a flow rate of a condensate hydrocarbon stream introduced into the shell-side of the first condensate thermosyphon reboiler from a first condensate flow rate to a second condensate flow rate, and maintaining an operation of the condensate stabilizer system until the value of an overhead temperature of the first condensate thermosyphon reboiler is detected to have been modified from the first overhead temperature to a second overhead temperature. The method further includes modifying the flow rate of the condensate hydrocarbon stream introduced into the shell-side of the first condensate thermosyphon reboiler from the second condensate flow rate to the first condensate flow rate, and modifying the flow rate of the hot oil stream introduced into the tube-side of the first condensate thermosyphon reboiler from the second hot oil flow rate to the first hot oil flow rate such that the value of the overhead temperature of the first condensate thermosyphon reboiler is modified from the second overhead temperature to a post-cleaning overhead temperature. The post-cleaning overhead temperature is less than the pre-cleaning overhead temperature.

Other aspects and advantages of the claimed subject matter will be apparent from the following description and the appended claims.

DETAILED DESCRIPTION

For the purpose of this description, a single reference number will be assigned to a line as well as a stream carried in that line. Same reference numbers refer to similar components. The person skilled in the art will readily understand that while this disclosure is illustrated making reference to one or more specific combinations of features and measures many of those features and measures are functionally independent from other features and measures such that they can be equally or similarly applied independently in other embodiments or combinations.

Conventional GOSPs may also include a stabilizer column fed by an unstabilized hydrocarbon condensate liquid bottom stream from the main gas/liquid separator. The unstabilized hydrocarbon condensate stream may include light hydrocarbons; heavy hydrocarbons; acid gases, such as $H_2S$ and $CO_2$; inert gases, such as $N_2$; and a brine or saline water component. This unstabilized hydrocarbon condensate stream is separated in the stabilizer column into an overhead vapor product and a stabilized bottoms product. The overhead vapor product may contain the light hydrocarbons, the gases, and water vapor. The stabilized hydrocarbons bottom product may contain the heavy hydrocarbons in liquid form. As part of the stabilizer column, the unstabilized hydrocarbon condensate is indirectly heat exchanged against a hot oil stream in a plurality of reboilers. The hot oil stream may be a portion of the liquid stream (condensate) being discharged from the bottom of the stabilizer column or may be a hydrocarbon stream from elsewhere in the GOSP. In one or more embodiments, the reboilers may be any type of known reboiler, such as a thermosyphon reboiler.

Figure 1:
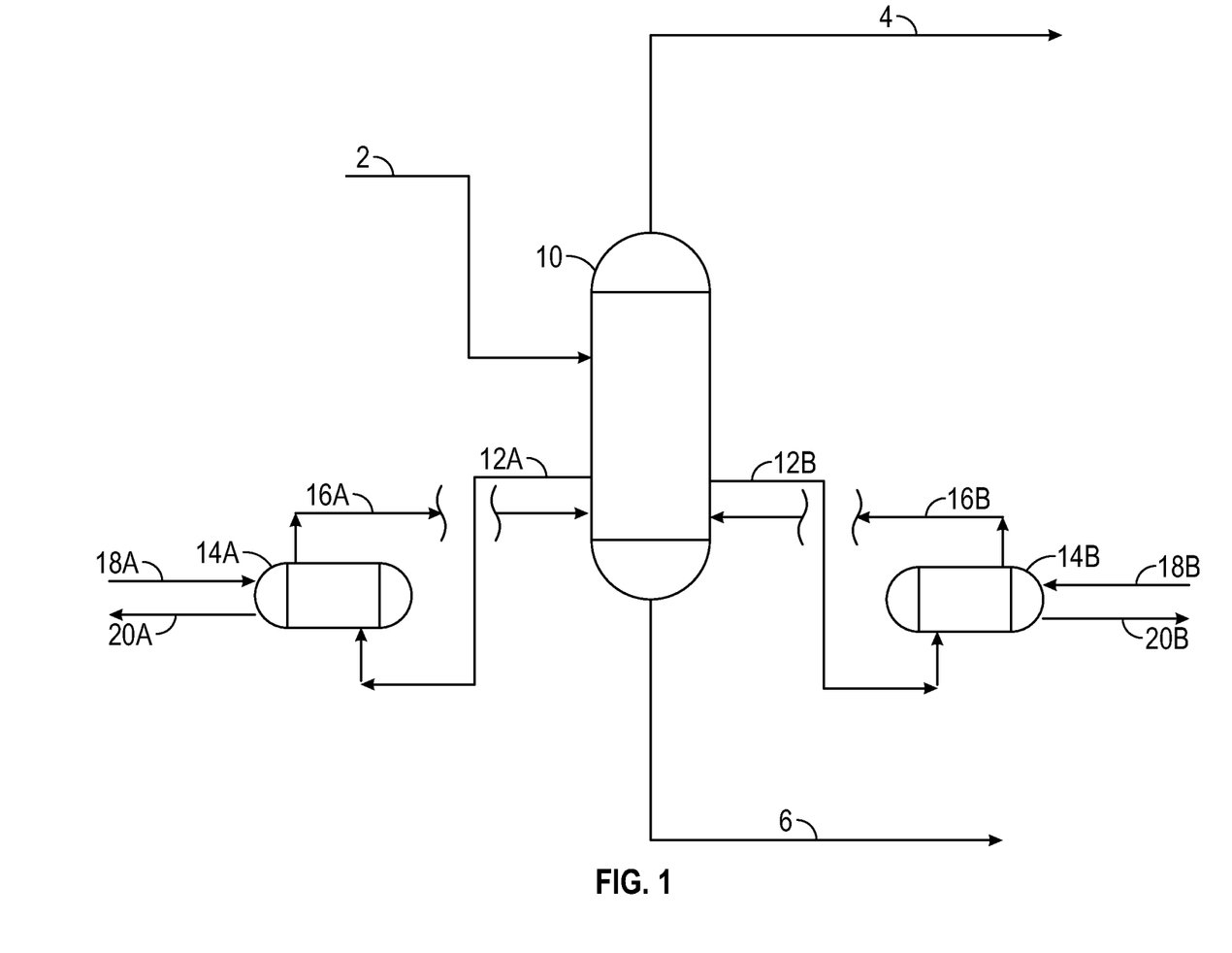
FIG. 1 is a simplified schematic of a condensate stabilization system.

Referring to FIG. 1, a simplified schematic of a condensate stabilizer system is illustrated. An unstabilized hydrocarbon condensate stream 2 is introduced into a stabilizer column 10 that consists of a number of trays, such as 5, 10, or 15 trays, excluding a chimney tray, numbered starting from the bottom of the stabilizer column 10. The unstabilized hydrocarbon condensate stream 2 is separated into a liquid phase containing a stabilized hydrocarbon condensate 6 discharged from a bottom end of the stabilizer column 10 and an overhead vapor stream 4 containing light hydrocarbons, optionally other gases, and water vapor is discharged from a top end of the stabilizer column 10.

The unstabilized hydrocarbon condensate stream may include a mix of light and heavy hydrocarbons, free water, and dissolved and free gases. Further, the free water in the condensate may have a high salinity. For example, the unstabilized hydrocarbon condensate may contain up to 1 wt % (weight percent) methane, up to 2 wt % ethane, up to 3 wt % propane, up to 5 wt % $C_4$s, greater than 80 wt % $C_5^+$, up to 0.05 wt % $N_2$, up to 0.5 wt % $CO_2$, up to 0.05 wt % $H_2S$, and up to 0.25 wt % $H_2O$. The $H_2O$ component may also contain up to 5-10 wt % salt with respect to the $H_2O$.

In order to provide adequate heat duty to the stabilizer column 10 a plurality of thermosyphon reboilers may be provided. A mixed phase condensate stream 12A may pass from above the chimney tray of the stabilizer column 10. The mixed phase condensate stream 12A may be fluidly coupled with and introduced into a shell-side of a first condensate thermosyphon reboiler 14A. The first condensate thermosyphon reboiler may be designed to bring the mixed phased condensate stream 12A into indirect heat exchange with a hot oil stream 18A. The hot oil stream 18A may be fluid coupled with, and introduced into, the tube-side of the first condensate thermosyphon reboiler 14A. The heat from the hot oil stream 18A may cause at least a portion of the mixed phase condensate stream 12A to be evaporated, producing a first vapor phase stream 16A. The first vapor phase stream 16A may be fully or partially recycled to the stabilizer column 10 for both thermal drive and additional processing. A solid phase may accumulate on the tube surfaces on the shell-side in the first condensate thermosyphon reboiler 14A. A cooled oil stream 20A may also pass from the first condensate thermosyphon reboiler 14A.

The first condensate thermosyphon reboiler 14A, the mixed phase condensate stream 12A, first vapor phase stream 16A, hot oil stream 18A, and cooled hot oil stream 20A may be referred to as the "A-side exchanger system." A "B-side exchanger system" may also be provided having a similar system configuration. Such a configuration may include a second condensate thermosyphon reboiler 14B, mixed phase condensate stream 12B, second vapor phase stream 16B, hot oil stream 18B, and cooled oil stream 20B. The A-side exchanger system and B-side exchanger system may be operated in parallel simultaneously or in a staggered fashion, where one exchanger system is providing 100% of the heat duty to the stabilizer column while the other exchanger system is offline.

While described and illustrated as a single A-side exchanger system and a single B-side exchanger system, one of ordinary skill in the art would recognize the system may also be provided with additional heat exchangers, such as a C-side exchanger system, D-side exchanger system, and so on. Further, the A-side exchanger system and B-side exchanger system may each include more than one heat exchanger, such as a thermosyphon reboiler, which collectively may be operated in parallel as the A-side exchanger system or B-side exchanger system.

Stabilizer column thermosyphon reboiler salt fouling is an ongoing challenge of gas condensate stabilizer operation and may be caused by one or more of i) water carry over from upstream slug catchers due to frequent slugging, ii) high salinity in the free water in the condensate feed, and iii) high reboiler temperature. For example, as the thermosyphon reboiler fouls, the buildup of salt will cause a drop in condensate flow, resulting in a higher reboiler condensate outlet vapor temperature even at a very low hot oil flow rate in the reboiler. The drop in condensate flow may be attributed significantly to impediment of flow within the shell-side of the reboiler.

As a result of varying composition of the unstabilized hydrocarbon condensate stream, fouling often occurs within the thermosyphon reboilers. Fouling may occur as the salt in the free water portion of the unstabilized condensate accumulates on the outside of the tubes which contain the hot oil stream as the mixed phase condensate stream is evaporated. In one or more embodiments, salt fouling may also occur due to high temperature, a change in feed quality, or both. The salt fouling may occur on the reboiler shell-side tube surface when the mixed phase condensate containing free water is evaporated and the salt remains on the surface of the tubes that contain the hot oil stream. Such salt fouling reduces the efficiency of the thermosyphon reboiler by reducing the heat transfer coefficient. Remedying such fouling may require system downtime that may result in off-specification product. As well, the use of desalting chemicals and tools in order to clean the residue may be hazardous to personnel.

Accordingly, salt fouling is the accumulation of unwanted salts, such as sodium chloride, on surfaces inside the heat exchanger. Fouling adds resistance to heat transfer. Fouling can also lead to plugging that can ultimately lead to greater pressure differential, reduced capacity or throughput, and blockage of the fluid flow. Other damage potentially caused by fouling includes permanent damage to the exchanger bundles, where the outsides of tubes or plate channels cannot be effectively cleaned or the shape of the tube bundle is disturbed, for example, bent. In these cases, the exchanger or at least the bundle may need to be replaced.

Mechanical damage, corrosion, failure of internal sealing devices, and thermal or mechanical stresses to the heat exchanger, such as a thermosyphon reboiler, may also lead to cross-leakage, in particular to connections between different parts, different metallurgies, or both.

As a result, the stabilizer column and its thermosyphon reboilers may require frequent shutdown to conduct reboiler mechanical cleaning. The mechanical cleaning may result in loss of production of stabilized hydrocarbons and incur significant maintenance. In addition, the high salt content in the export condensate may result in an operations upset in downstream facilities. The salt content may also impact the associated equipment and piping reliability.

Accordingly, one or more embodiments disclosed is a process that may accomplish online cleaning of the thermosyphon reboilers by relaxing the reboiler overhead temperature through controlling the reboiler hot oil flow in a manual operating mode to slow down and minimize the salt deposition on thermosyphon reboiler tubes. In addition, controlled and repeated flow manipulation on the shell-side may mitigate the settling of salt on the thermosyphon reboiler tube surface as well as remove any deposited salt from the thermosyphon reboiler tube surface. The mechanism by which this occurs may be attributed to condensate thrust force or momentum of the flow of fluid. This condensate thrust force is caused by the agitation within the shell-side of the thermosyphon reboiler by the controlled and repeated flow manipulation.

Accordingly, one or more embodiments of the present disclosure may provide at least one of the following advantages: cleaned online; reduced downtime; increased uptime; increased reliability; operated more predictably and stably; increased stabilized condensate production; maintained consistent export product quality; and maximized equipment reliability. This process may be performed while also maintaining the export condensate product quality within set limits. Subsequently, the results of the process may reduce or even eliminate observed excess salt in the export condensate. The process may avoid frequent stabilizer unit operational shutdowns, repairs, or even unit replacement.

Figure 2:
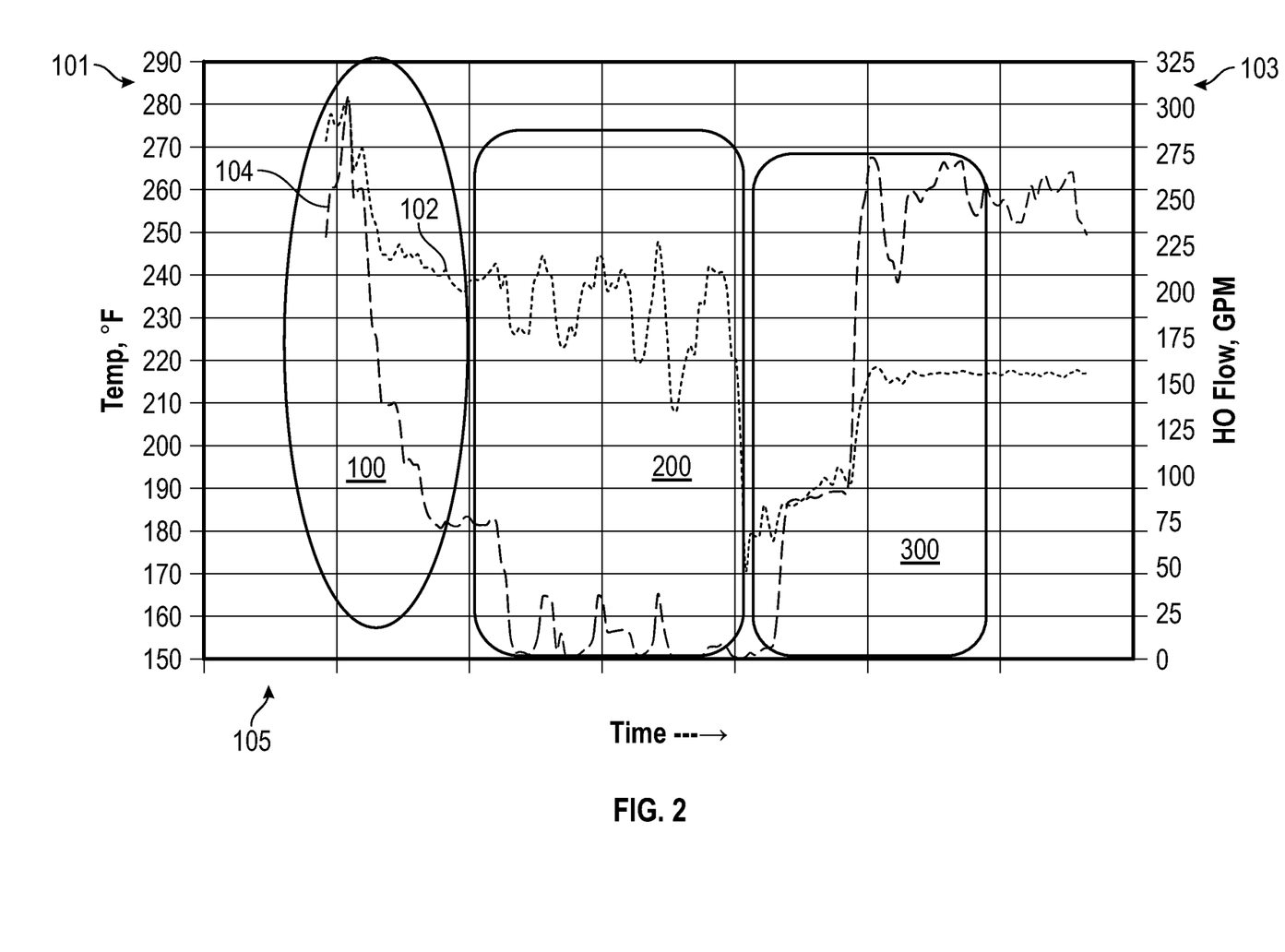
FIG. 2 is a graph illustrating the fouling and cleaning phases of the process according to one or more embodiments.

FIG. 2 is a graph illustrating the fouling and cleaning phases of a process. Referring now to FIG. 2, in one or more embodiments, as time progresses along the x-axis 105, the onset of reboiler salt fouling may be indicated by an elevated reboiler overhead temperature from a stable operating temperature. A stable operating temperature for a reboiler overhead temperature may be in a range of from about 205° F. to about 230° F., such as from about 210° F. to about 225° F., with temperature being indicated by y-axis 101. An increase in reboiler overhead temperature may be observed with a relatively un-steady reboiler overhead temperature and hot oil feed flow rate, such as at a temperature in the range of 190 to 280° F. and a hot oil feed flow rate in a range of from about 150 to about 550 gallons per minute (GPM), with flow rate being indicated by y-axis 103. The total hot oil flow rate may be based on the amount of hot oil needed to heat the amount of condensate flowing to each of the reboilers. In FIG. 2, one may observe this in the salt fouling initiation period 100 of the graph. The elevation in the overhead temperature 102 may indicate that the reboiler has significant salt fouling. In such a situation, an online cleaning according to one or more embodiments, should be performed. In one or more embodiments, the process includes detecting an elevated reboiler overhead temperature at low hot oil flow due to low condensate flow. Thermosyphon reboilers operate in such a fashion where the condensate evaporates and exits the reboiler and liquid condensate is pulled into the reboiler in a corresponding volume. Accordingly, the reboiler overhead condensate temperature rise may be attribute to the low condensate flow through the reboiler due to obstruction caused by the salt fouling. As the reboiler becomes fouled, condensate flow is restricted leading to an increase in residence time within the reboiler and a corresponding reduced amount of liquid condensate entering the reboiler. As the condensate flow from a fouled reboiler is reduced, the condensate flow from the non-fouled reboiler may increase, leading to a stabilized flow and pressure within the stabilizer column.

During routine operations, one or more of the thermosyphon reboilers may be operated in either a manual operating mode or an automatic operating mode. If salt fouling is suspected, the operation of the reboiler should be modified such that it is operating in a manual (non-automated) control condition. At the onset of salt fouling, if the thermosyphon reboiler is operating in the manual mode, it may be left in the manual mode. However, if the thermosyphon reboiler is operating in the automatic mode, it may be switched to the manual mode. In one or more embodiments, the process includes modifying the operation of the reboiler to a manual control condition.

The online cleaning process, according to one or more embodiments, may include operating the system such that the fluid flow rate 104 of the hot oil stream of the reboiler being treated is reduced from a first hot oil flow rate to a second hot oil flow rate. In the example shown in FIG. 2, the first hot oil flow rate may be from about 150 to about 300 GPM. In one or more embodiments, the first hot oil flow rate may be outside of this range depending on, for example, the heat duty required for the stabilizer column and depending on the number of thermosyphon reboilers in service as well as the volume of unstabilized condensate fed to the system. To accommodate systems of different sizes, the second hot oil flow rate may be described as a ratio with respect to the first hot flow rate. In one or more embodiments, the fluid flow rate ratio of the first hot oil flow rate to second hot oil flow rate may be in a range of from about 4:3 to 60:1. In one or more embodiments, the first hot fluid flow rate is in a range of from about 150 to 300 GPM, and the second hot oil fluid flow rate is in a range of from about 5 to about 200 GPM. During this period where the hot oil fluid flow rate is reduced in the fouled reboiler, the hot oil fluid rate in the non-fouled reboiler may be in the range from about 150 to 550 GPM. Such an increase in hot oil flow in the non-fouled reboiler may allow of the stabilizer column to operate at a relatively steady state.

A step in the online cleaning process, according to one or more embodiments, may include operating the system such that the range of the reboiler overhead temperature 102 is expanded from a first reboiler overhead temperature range to a second reboiler overhead temperature range. In one or more embodiments, the first reboiler overhead temperature operating range may be in a range of from about 205° F. to 225° F., and the second reboiler overhead temperature operating range for cleaning operations may be in a wider range, such as from about 190° F. to 240° F. In one or more other embodiments, the first reboiler overhead temperature operating range may be in a range of from about 220° F. to 225° F., and the second reboiler overhead temperature operating range for cleaning operations may be in a wider range, such as from about 200° F. to 240° F. Expansion of the reboiler overhead temperature may allow for the hot oil flow or condensate flow to fluctuate more than would occur during a period where the reboiler overhead temperature is more tightly controlled, and hence manual control and monitoring of the system during this process may be necessary.

Figure 3:
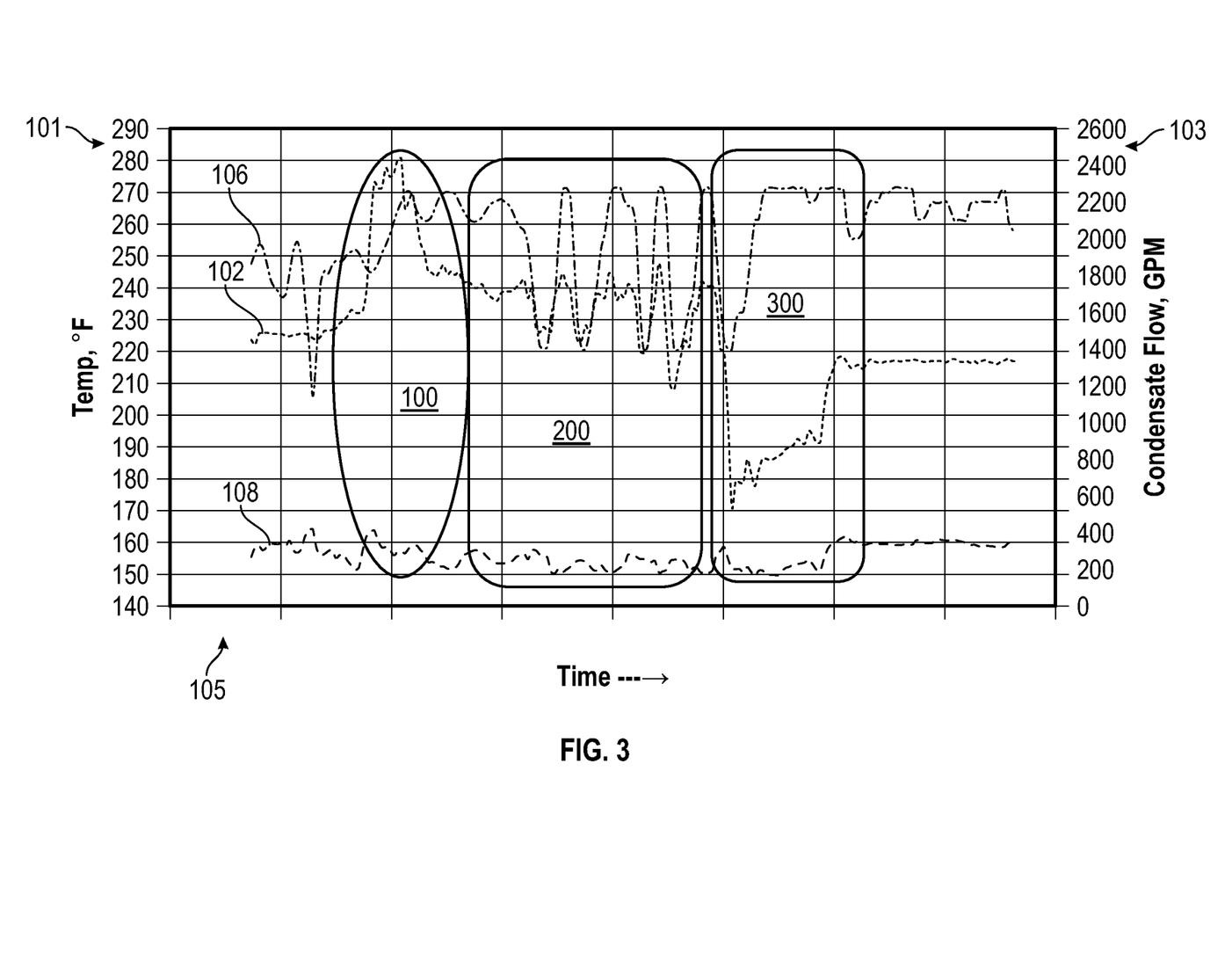
FIG. 3 is a graph illustrating the fouling and cleaning phases of the process according to one or more embodiments.

After the reboiler overhead temperature set point is relaxed, a flow rate of the condensate hydrocarbon stream in the shell-side of the reboiler may be changed from a first condensate flow rate to a second condensate flow rate. FIG. 3 is a graph illustrating the fouling and cleaning phases of the process. For example, as illustrated in FIG. 3, the condensate flow rate 106 may have a first condensate flow may be in a range of from about 1100 to about 2200 GPM and the second condensate flow rate may be in a range of from about 1200 to about 2300 GPM. To accommodate systems of different sizes, the second condensate flow rate may be expressed as a ratio with respect to the first condensate flow rate. For example, the ratio of the first condensate flow rate to the second condensate flow rate may be in a range of from about 11:23 to 6:11, such as from 1:2 to 3:4.

In one or more embodiments, the condensate flow rate in the reboiler may be maintained at the second condensate flow rate for a first period to dislodge and remove the salt covering the tubes on the shell-side of the reboiler. The end of the first period may be indicated by a decline in the reboiler overhead temperature. For example, as seen in FIG. 2, the reboiler overhead temperature declined after the cleaning period 200 was complete. As seen in FIG. 3, in one or more embodiments, the condensate flow rate 106 at which the condensate is introduced into the reboiler may be held at the second condensate flow rate for a first period and then modified back to the first condensate flow rate for a second period. This alternating between the first condensate flow rate and the second condensate flow rate for introducing the condensate to the reboiler may be repeated until it is detected that the reboiler overhead temperature is declining while the introduction flow rate of the hot oil stream is maintained. In one or more embodiments, the condensate flow rate 106 may be alternated in a range of from 1 to 10 times before a decline in the reboiler overhead temperature is detected. In the example shown as part of FIG. 3, in the cleaning period 200 the condensate fluid flow rate was cycled 4 times before a decline in the reboiler overhead temperature 102 was observed.

After a decrease in reboiler overhead temperature is detected, the reboiler may be put back into standard operating service. The system may be operated such that the reboiler overhead temperature may be modified from the second reboiler overhead temperature range back to the first reboiler overhead temperature range. The system may be operated such that the flow rate of the hot oil stream may be modified from the second hot oil flow rate to the first hot oil flow rate. In FIG. 2, an example shows that after a further period 300, the reboiler overhead temperature steadily increases to a temperature in the range of the standard operating reboiler overhead temperature, or post-cleaning temperature. In one or more embodiments, the treated reboiler may be returned to the automatic operating mode or left in the manual operating mode.

The onset of reboiler salt fouling may be indicated by a sudden increase in the reboiler overhead temperature, change in feed quality, such as a higher amount of free water with higher salinity, or both. However, the online cleaning procedure may be started when a gradual rise in reboiler overhead temperature occurs. The process may be utilized on a regular or periodic schedule as "preventative maintenance" activity.

Figure 4:
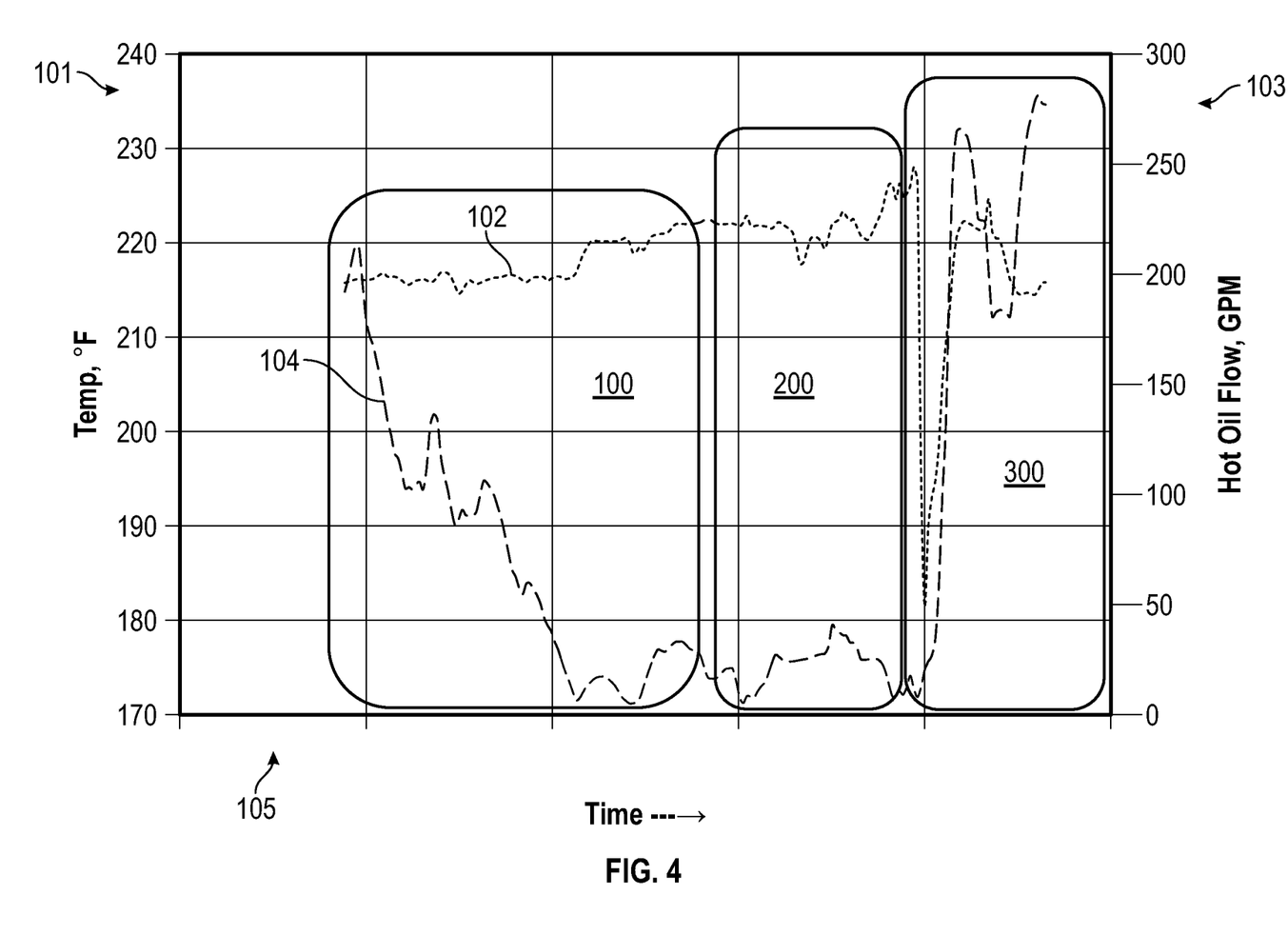
FIG. 4 is a graph illustrating the fouling and cleaning phases of the process according to one or more embodiments.

FIG. 4 is a graph illustrating the fouling and cleaning phases of the process. As seen in FIG. 4, a gradual increase in reboiler overhead temperature 102 is observed during the period 100. The hot oil flow rate 104 is gradually reduced from the first hot oil flow rate to the second hot oil flow rate. At the end of the cleaning period 200 (also referred to as "cleaning mode"), the reboiler overhead temperature 102 declines in a short period, indicating that the foulant has been removed. The hot oil flow rate 104 is returned to the first hot oil flow rate and the reboiler overhead temperature returns to a first temperature range during the recovery period 300 (also referred to as "recovery mode").

Figure 5:
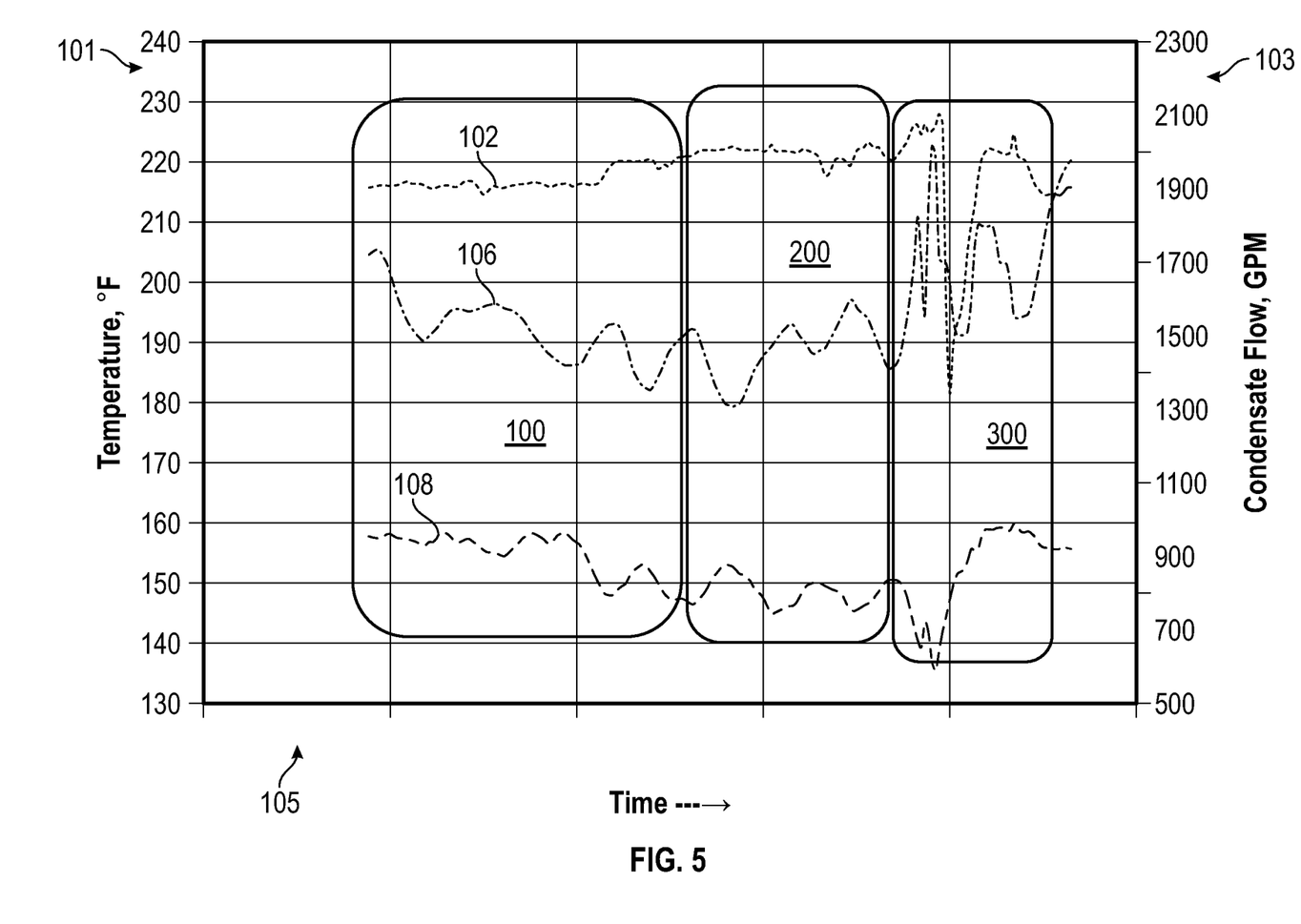
FIG. 5 is a graph illustrating the fouling and cleaning phases of the process according to one or more embodiments.

FIG. 5 is a graph illustrating the fouling and cleaning phases of the process. As illustrated in FIG. 5, the condensate flow rate 106 may be modified from the first condensate flow rate to the second condensate flow rate a plurality of times until the decline in reboiler overhead temperature 102 is detected.

Referring to both FIGS. 3 and 5, during the online cleaning process, according to one or more embodiments, the stabilizer column first tray temperature 108 remains relatively stable in a range of from about 140° F. to about 175° F. As used herein, "stabilizer column first tray temperature" indicates the temperature of the first tray above the chimney tray within the stabilizer column. In one or more embodiments the stabilizer column first tray temperature 108 may be in a range of from about 140° F. to 160° F., or in a range of from about 140° F. to 155° F. This is due, in part, to the second reboiler (B-side exchanger system) remaining in standard operating service while the first reboiler (A-side exchanger system) undergoes online cleaning. In this fashion, switching the operating mode between standard operations and cleaning modes for both the A-side and B-side exchanger systems may be staggered such that one exchanger system is always providing sufficient heat duty to maintain stability of stabilizer column operation while the other exchanger system is cleaned.

In one or more embodiments, a process for staggered operation between exchanger systems may be performed by operating the system such that the flow rate of the hot oil stream in the tube-side of the first reboiler is modified from the first hot oil flow rate to the second hot oil flow rate, such that the first reboiler overhead temperature is modified from a first reboiler overhead temperature range to a second reboiler overhead temperature range, and such that the flow rate of the condensate introduced into the reboiler is modified from a first flow rate to the second flow rate until a decline in the reboiler overhead temperature is detected. The first reboiler may then be brought back into regular service by operating the system such that the reboiler overhead temperature is returned to the first reboiler overhead temperature range and by operating the system such that the flow rate of the hot oil stream introduced into the reboiler is returned to the first hot oil flow rate. The process may then be repeated for second reboiler while the cleaned, first reboiler operates normally.

In one or more embodiments, the staggered mode of operation may be performed using more than two reboilers. For example, in some embodiments, three reboilers may be in service. In embodiments where three reboilers are in service, the first reboiler, second condensate thermosyphon reboiler, and third reboiler may each be in cleaning mode, recovery mode, or normal operating mode. The mode of each reboiler may not overlapping with the mode of any other reboiler except that more than one reboiler may be in normal operating mode at the same time.

In other embodiments, the "A-side exchanger system" may include two or more thermosyphon reboilers, and the "B-side exchanger system" may include two or more thermosyphon reboilers with all reboilers on each side operating in parallel. In such embodiments, all the reboilers that make up the "A-side exchanger system" may be in cleaning mode while all the reboilers that make up the "B-side exchanger system" may be in normal operating mode. A person of ordinary skill may appreciate that such systems, as previously described, may contain additional sets of system, where each set is operating in a particular mode.

Due in part to the nature of the online cleaning and staggered operation of the condensate thermosyphon reboilers, a quantity of condensate recycle to the stabilizer column may continue to come from the reboiler in normal operating mode. The reboiler in normal operating mode may not currently be affected by salt fouling but may be operating at a comparatively greater temperature to the reboiler in the cleaning mode. In addition, operating the reboiler at a comparatively greater temperature also may provide for high-quality condensate recycle. Upon blending the greater amount of high-quality condensate coming from the reboiler in the normal operating mode with comparatively small or negligible amounts of reduced-quality condensate coming from the reboiler in cleaning mode, the impact on the export condensate quality may be minimal.

Figure 6:
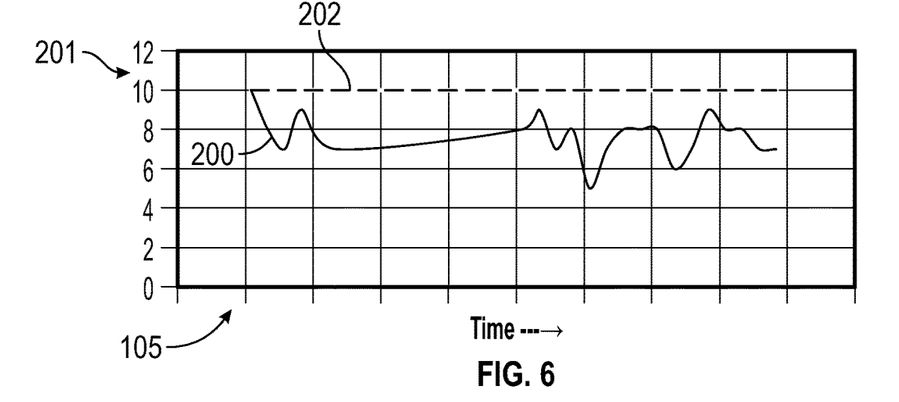
FIG. 6 is a graph illustrating an export condensate property over time according to one or more embodiments.
Figure 7:
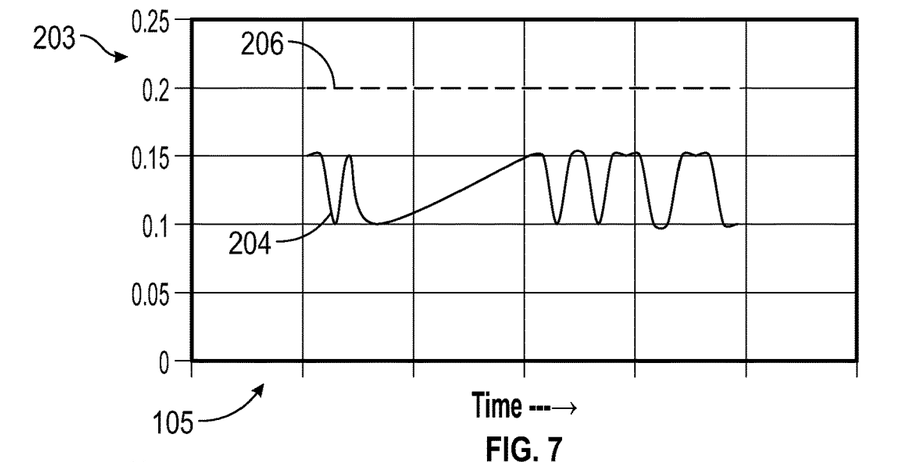
FIG. 7 is a graph illustrating an export condensate property over time according to one or more embodiments.
Figure 8:
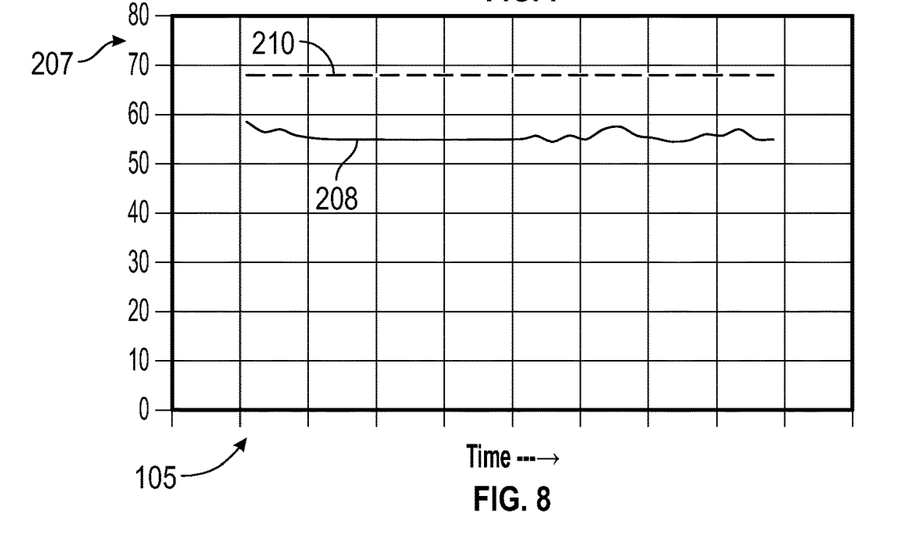
FIG. 8 is a graph illustrating an export condensate property over time according to one or more embodiments.

FIGS. 6, 7, and 8 are graphs illustrating export condensate properties over time. Lab sample analysis was performed on export condensate several times during the online cleaning process as illustrated in FIGS. 6-8. As illustrated in FIG. 6, with time on the x-axis 105 and salt content on y-axis 201, the salt content 200 in pounds of salt per thousand barrels (PTB) in the condensate is less than the PTB limit 202 of 10

PTB. As illustrated in FIG. 7, with wt % on y-axis 203, the bottom sediment and water wt % 204 is less than the wt % limit 206 of 0.2 wt %. Additionally, as illustrated in FIG. 8, with API (American Petroleum Institute) degrees (°) on the y-axis 207, the API 208 is less than the API limit 210 of 70° API. Accordingly, all properties were at, or within, the specification limit during the entire cleaning procedure.

In one or more embodiments disclosed, fouling can also be detected by measuring parameters of the heat transfer process in the reboilers, such as, but not limited to, measuring changes in temperatures, by determining the heat transfer coefficients (predicted and observed), or by measuring pressure drop from the shell-side inlet to the shell-side outlet. Fouling may also be detected using tomography, video cameras, infrared thermal imaging, or a combination thereof to determine if there is misdistribution of heat transfer within the reboiler is occurring.

In one or more embodiments, sensors may be placed on the inlet and outlet of the shell-side, the tube-side, or both of each reboiler. The sensors may detect the temperature, pressure, fluid flow rate, or a combination thereof in each reboiler. A determination may also be made in the differences in pressure and temperature between reboilers within a system and between systems of reboilers. The sensors may provide data for collection that may be used to determine if the reboiler or a system of reboilers are operating normally or if salt fouling may be occurring. If salt fouling is determined, the online cleaning process according to one or more embodiments disclosed may be performed.

Unless defined otherwise, all technical and scientific terms used have the same meaning as commonly understood by one of ordinary skill in the art to which these systems, apparatuses, methods, processes, and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims, except for those in which the claim expressly uses the words "means for" or "step for" together with an associated function.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open-ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of." The words "comprise," "has," and "include" and all grammatical variations thereof are each intended to have an open, non-limiting meaning that does not exclude additional elements or steps.

What is claimed:

1. A method of cleaning a condensate thermosyphon reboiler of a condensate stabilizer system, the condensate stabilizer system comprising a plurality of condensate thermosyphon reboilers, the method comprising:
   modifying a flow rate of a hot oil stream introduced into a tube-side of a first condensate thermosyphon reboiler having a pre-cleaning overhead temperature from a first hot oil flow rate to a second hot oil flow rate such that the pre-cleaning overhead temperature is modified to a first overhead temperature, the first overhead temperature having a value in a range from a first temperature to a second temperature;
   modifying a flow rate of a condensate hydrocarbon stream introduced into a shell-side of the first condensate thermosyphon reboiler from a first condensate flow rate to a second condensate flow rate;
   maintaining an operation of the condensate stabilizer system until the value of an overhead temperature of the first condensate thermosyphon reboiler is detected to have been modified from the first overhead temperature to a second overhead temperature;

modifying the flow rate of the condensate hydrocarbon stream introduced into the shell-side of the first condensate thermosyphon reboiler from the second condensate flow rate to the first condensate flow rate;

modifying the flow rate of the hot oil stream introduced into the tube-side of the first condensate thermosyphon reboiler from the second hot oil flow rate to the first hot oil flow rate such that the value of the overhead temperature of the first condensate thermosyphon reboiler is modified from the second overhead temperature to a post-cleaning overhead temperature where the post-cleaning overhead temperature is less than the pre-cleaning overhead temperature;

where the condensate stabilizer system further comprises:
a condensate stabilizer column configured to produce a mixed hydrocarbon/water vapor and a stabilized condensate from an unstablized hydrocarbon condensate, where the stabilizer column is fluidly coupled separately to the shell-side of each of the plurality of condensate thermosyphon reboilers, and where the tube-side of each of the plurality of condensate thermosyphon reboilers includes a hot oil stream inlet and a hot oil stream outlet with the hot oil stream being fluid coupled separately to the hot oil stream inlet on each of the plurality of condensate thermosyphon reboilers.

2. The method of claim 1, where the pre-cleaning overhead temperature is greater than or equal to 230° F.

3. The method of claim 1, where the first reboiler overhead temperature has a temperature range of about 30° F.

4. The method of claim 1, where the second overhead temperature is less than or equal to 190° F.

5. The method of claim 1, where the post-cleaning overhead temperature is in a range of from about 205 to 225° F.

6. The method of claim 1, where a ratio of the first condensate flow rate to the second condensate flow rate is in a range of from about 11:22 to 6:11.

7. The method of claim 1, where a ratio of the first hot oil flow rate to second hot oil flow rate is in a range of from about 4:3 to 60:1.

8. The method of claim 1, further comprising repeating the modifying the flow rate of the condensate hydrocarbon stream step, the repeating comprising:
a) modifying the flow rate of the condensate hydrocarbon stream introduced into the shell-side of the first condensate thermosyphon reboiler from the first flow rate to the second flow rate;
b) maintaining the second flow rate for a first period;
c) modifying the flow rate of the condensate hydrocarbon stream introduced into the shell-side of the first condensate thermosyphon reboiler from the second flow rate to the first flow rate;
d) maintaining the first flow rate for a second period; and
e) repeating steps a) to d) until the overhead temperature of the first condensate thermosyphon reboiler is modified from the first overhead temperature to the second overhead temperature with the same flow rate of the hot oil stream.

9. The method of claim 1, further comprising staggering the cleaning of the plurality of condensate thermosyphon reboilers by cleaning the first condensate thermosyphon reboiler of the plurality of condensate thermosyphon reboilers before cleaning a second condensate thermosyphon reboiler of the plurality of condensate thermosyphon reboilers.

10. The method of claim 9, where cleaning the second condensate thermosyphon reboiler comprises:

modifying a flow rate of a hot oil stream introduced into a tube-side of the second condensate thermosyphon reboiler from the first hot oil flow rate to the second hot oil flow rate such that the pre-cleaning overhead temperature is modified to the first overhead temperature, the first overhead temperature having a value in the range from the first temperature to the second temperature;

modifying a flow rate of a condensate hydrocarbon stream introduced into a shell-side of the second condensate thermosyphon reboiler from the first condensate flow rate to the second condensate flow rate;

maintaining the operation of the condensate stabilizer system until the value of an overhead temperature of the second condensate thermosyphon reboiler is detected to have been modified from the first overhead temperature to a second overhead temperature;

modifying the flow rate of the condensate hydrocarbon stream introduced into the shell-side of the second condensate thermosyphon reboiler from the second condensate flow rate to the first condensate flow rate;

modifying the flow rate of the hot oil stream introduced into the tube-side of the second condensate thermosyphon reboiler from the second hot oil flow rate to the first hot oil flow rate such that the value of the overhead temperature of the second condensate thermosyphon reboiler is modified from the second overhead temperature to the post-cleaning overhead temperature where the post-cleaning overhead temperature is less than the pre-cleaning overhead temperature.

11. The method of claim 10, further comprising repeating the modifying the flow rate of the condensate hydrocarbon stream step, the repeating comprising:
a) modifying the flow rate of the condensate hydrocarbon stream introduced into the shell-side of the second condensate thermosyphon reboilers from the first flow rate to the second flow rate;
b) maintaining the second flow rate for a first period;
c) modifying the flow rate of the condensate hydrocarbon stream introduced into the shell-side of the second condensate thermosyphon reboilers from the second flow rate to the first flow rate;
d) maintaining the first flow rate for a second period; and
e) repeating steps a) to d) until the overhead temperature of the first condensate thermosyphon reboiler is modified from the first overhead temperature to the second overhead temperature with the same flow rate of the hot oil stream.

12. The method of claim 1 further comprising:
introduce an unstabilized hydrocarbon condensate stream to the condensate stabilizer, the unstabilized hydrocarbon condensate stream comprising light hydrocarbons, heavy hydrocarbons, water, or a combination thereof;
partially evaporating the unstabilized hydrocarbon condensate stream;
passing from a bottom end of the condensate stabilizer a liquid phase comprising stabilized hydrocarbon condensate,
passing from a top end of the condensate stabilizer an overhead vapor phase comprising the mixed hydrocarbon/water vapor;
passing from above a chimney tray of the condensate stabilizer the condensate hydrocarbon stream;
introducing the condensate hydrocarbon stream to the one or more condensate thermosyphon reboilers;
introducing the hot oil stream to each of the plurality of condensate thermosyphon reboilers, wherein the hot oil stream is introduced into the tube-side of the plurality of condensate thermosyphon reboilers and the condensate hydrocarbon stream is introduced into the shell-side of the plurality of condensate thermosyphon reboilers;

partially evaporating the condensate hydrocarbon stream in the plurality of condensate thermosyphon reboilers, producing a first vapor phase and a solid phase; and recycling the first vapor phase to the condensate stabilizer;

where the solid phase is deposited on a surface of one or more tubes in the shell-side of the one or more condensate thermosyphon reboilers.

* * * * *